US007113345B2

(12) United States Patent
Mihara et al.

(10) Patent No.: US 7,113,345 B2
(45) Date of Patent: Sep. 26, 2006

(54) ZOOM LENS, AND ELECTRONIC IMAGING SYSTEM USING THE SAME

(75) Inventors: Shinichi Mihara, Tama (JP); Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 93 days.

(21) Appl. No.: 10/963,555

(22) Filed: Oct. 14, 2004

(65) Prior Publication Data

US 2006/0002694 A1    Jan. 5, 2006

(30) Foreign Application Priority Data

Oct. 15, 2003    (JP) .............................. 2003-355176

(51) Int. Cl.
*G02B 15/14* (2006.01)
(52) U.S. Cl. ...................... 359/676; 359/678
(58) Field of Classification Search ........ 359/676–692; 396/72, 351; 348/240.3
See application file for complete search history.

(56) References Cited

U.S. PATENT DOCUMENTS

| 4,265,529 | A | * | 5/1981 | Yokota ........................ 396/384 |
| 5,272,565 | A | * | 12/1993 | Oshikiri ...................... 359/682 |
| 5,570,229 | A |   | 10/1996 | Kanamori ................... 359/431 |
| 6,104,432 | A | * | 8/2000 | Nakamura et al. .......... 348/360 |
| 6,124,987 | A |   | 9/2000 | Kayanuma et al. ......... 359/692 |
| 6,308,011 | B1 |  | 10/2001 | Wachi et al. ................. 396/72 |
| 6,754,446 | B1 | * | 6/2004 | Hagimori et al. ............. 396/72 |

FOREIGN PATENT DOCUMENTS

JP    11-194274    7/1999

OTHER PUBLICATIONS

Photograph Industry Mar. 2002 Report of the Front Line of Images Minolta DiMAGE X.

* cited by examiner

*Primary Examiner*—Scott J. Sugarman
*Assistant Examiner*—M. Hasan
(74) *Attorney, Agent, or Firm*—Kenyon & Kenyon LLP

(57) ABSTRACT

A zoom lens with high optical specification performances and an incorporated electronic imaging system that is much slimmer in its depth direction, albeit having that zoom lens mounted thereon includes a lens group G1 located nearest to the object side, having a reflecting surface M for bending an optical path. The zoom lens satisfies two conditions with respect to a length d as measured along the optical path from the apex of the surface nearest to the object side in lens group G1 to reflecting surface M and a dimension a of the outside shape of a positive lens, found first as viewed along the optical path from the reflecting surface M toward an image side of the zoom lens, in a direction parallel with an optical axis on an object side of the zoom lens with respect to the position where the optical path is bent, respectively.

22 Claims, 10 Drawing Sheets

ZOOM LENS, AND ELECTRONIC IMAGING SYSTEM USING THE SAME

This application claims benefit of Japanese Application No. 2003-355176 filed in Japan on Oct. 15, 2003, the contents of which are incorporated by this reference.

BACKGROUND OF THE INVENTION

The present invention relates generally to a zoom lens and an electronic imaging system that incorporates the same, and more specifically to a zoom lens fit right for electronic imaging systems such as video cameras and digital cameras, which can be slimmed down in the depth direction by applying some contrivances to an optical system portion, especially a zoom lens portion.

SUMMARY OF THE INVENTION

In recent years, digital cameras (electronic cameras) have received attention as the coming generation of cameras, an alternative to silver-halide 35 mm-film (usually called 135 format) cameras, and are now available in a wide spectrum of categories from commercial high-end to portable low-end types.

The greatest bottleneck in sliming down cameras in their depth direction is the thickness of the surface of an optical system, especially a zoom lens system, located nearest to its object side to an image pickup plane. The technology currently in vogue for slimming down camera bodies is the adoption of a collapsible lens mount that allows an optical system to be taken out of a camera body for phototaking and received therein for carrying. Some exemplary optical systems used with the collapsible lens mount are set forth in patent publications 1, 2, and 3. Each optical system comprises, in order from its object side, a first lens group having negative refracting power and a second lens group having positive refracting power, both designed to move during zooming.

There is now also another arrangement wherein the optical path (optical axis) through an optical system is bent by means of a reflecting optical element such as a mirror or a prism (non-patent publication 1). With the arrangement, no time is taken for a camera to get job started (or to set its lenses in place for use). That arrangement is preferable from waterproof and dustproof standpoints, and enables an associated camera to be even much slimmed down in its depth direction. In an optical system used, the lens group nearest to the object side remains fixed in position, with a reflecting optical element located therein. An optical path portion following that lens group is bent in the longitudinal or transverse direction of a camera body, so that its depth dimension can be minimized.

Patent Publication 1
JP(A)11-194274
Patent Publication 2
JP(A)11-287953
Patent Publication 3
JP(A)2000-9997
Non-Patent Publication 1
"Photographic Industry" 3/2002/103-106

SUMMARY OF THE INVENTION

A primary object of the present invention is to provide an electronic imaging system having a by far more reduced depth dimension, and a zoom lens to that end.

Another object of the invention is to provide an electronic imaging system that can offer a sensible tradeoff between wide view angles and compactness by way of image processing.

According to the first aspect of the invention, the above objects are accomplishable by the provision of a zoom lens that comprises a lens group located nearest to an object and comprising a reflecting surface for bending an optical path and a positive lens found first as viewed from said reflecting surface along said optical path toward an image side of the zoom lens, wherein:

said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6f_W < d < 1.5f_W \quad (1)$$

where $f_W$ is a focal length of a zoom lens system at a wide-angle end thereof, and $\underline{d}$ is a length as measured along said optical path from an apex of a surface nearest to the object in said lens group nearest to the object to said reflecting surface.

According to the second aspect of the invention, there is provided a zoom lens that comprises a lens group located nearest to an object and comprising a reflecting surface for bending an optical path and a positive lens found first as viewed from said reflecting surface along said optical path toward an image side of the zoom lens, wherein:

said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6f_W < d < 1.5f_W \quad (1)$$

where $f_W$ is a focal length of a zoom lens system at a wide-angle end thereof, and $\underline{d}$ is a length as measured along said optical path from an apex of a surface nearest to the object in said lens group nearest to the object to said reflecting surface.

According to the third aspect of the invention, there is provided a zoom lens that comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6f_W < d < 1.5f_W \quad (1)$$

$$1.2f_W < a < 3.0f_W \quad (2)$$

where $f_W$ is a focal length of a zoom lens system at a wide-angle end thereof, $\underline{d}$ is a length as measured along said optical path from an apex of a surface nearest to the object in said lens group nearest to the object to said reflecting surface, and $\underline{a}$ is a dimension of said outside shape of said positive lens in a direction parallel with an optical path portion on an object side of the zoom lens with respect to a position where said optical path is bent.

The advantages of, and the requirements for, the above zoom lens arrangements according to the invention are now explained.

When it comes to an optical path-bent type zoom lens, the depth dimension of the zoom lens is often determined depending on a distance from the apex of the surface nearest to the object side to a reflecting surface for bending an optical path (hereinafter called the reflecting surface for short). In the zoom lens of the invention, that reflecting surface is positioned in a lens group G1 located nearest to the object side of the zoom lens (hereinafter referred to as the lens group G1 for short). In consequence, the depth dimension of the zoom lens (optical unit) is determined by a distance $d$ as measured along an optical path from the apex of the surface nearest to the object side of the lens group to the reflecting surface. The lens group G1 comprises a lens in addition to the reflecting surface; the outside shape of that lens has some influences on slimming down the zoom lens. As viewed from the reflecting surface along the optical path toward the image side of the zoom lens of the invention, for instance, what comes upon first is a positive lens. In view of the outside shape of that positive lens (i.e., shape in section at right angles with the optical path), a dimension $a$ of that outside shape in a direction parallel with an optical axis portion on an object side of the zoom lens with respect to the position where the optical path is bent becomes significant.

As the upper limit of $1.5f_W$ to condition (1) and the upper limit of $3.0f_W$ to condition (2) are exceeded, the depth dimension of the optical unit becomes too large to achieve the above objects of the invention. As the respective lower limits of $0.6f_W$ and $1.2f_W$ are not reached, it is difficult to ensure wide angles of view.

More preferably in this regard, at least one of conditions (1') and (2') should be satisfied:

$$0.7f_W < d < 1.4f_W \quad (1')$$

$$1.3f_W < a < 2.5f_W \quad (2')$$

Even more preferably, at least one of conditions (1") and (2") should be satisfied:

$$0.8f_W < d < 1.3f_W \quad (1'')$$

$$1.4f_W < a < 2.0f_W \quad (2'')$$

Instead of satisfying conditions (1) and (2), it is also preferable to allow the positive lens to have a predetermined outside shape with satisfaction of condition (1). This positive lens is a lens that comes upon first as viewed from the reflecting surface along the optical path toward the image side. The "predetermined outside shape" refers to a non-circular shape in section in the direction at right angles with the optical path. More specifically, that positive lens is configured such that its depth dimension $a$ in the direction parallel with an optical path portion on the object side of the zoom lens with respect to the position where the optical path is bent becomes smallest, as shown in FIG. 4.

In a zoom lens such as that contemplated herein, increases in the height of light rays through the lens group G1 are fatally critical to slimming-down. The arrangement as described just above is effective in mitigation of this tendency that grows particularly when the first lens group G1 has positive refracting power. As the lens group G1 has positive refracting power, the refracting power of each element in that lens group G1 becomes strong, because the height of light rays through the lens group G1 must be as low as possible, rendering aberrations difficult to correct. It is thus desired that an aspheric surface be incorporated in the positive lens that comes upon first as viewed from the reflecting surface toward the image side.

The higher the refractive index of the medium before and after the reflecting surface in the lens group G1, the easier the size reductions of the zoom lens becomes; it is desired that the reflecting surface be formed of a part of prism surfaces.

To make the depth dimension of the zoom lens system smaller, that prism should preferably be located nearest to the object side thereof. If there is an optical element of some kind on an object side of the zoom lens with respect to the prism, some thickness will then add to the depth dimension thereof. To lower the height of light rays through the prism, on the other hand, it is preferable to allocate negative refracting power to the object side and positive refracting power to the image side with respect to the reflecting surface, enabling the entrance pupil to be located at as shallow a position as possible. Therefore in the invention, the prism is used to allocate negative refracting power on the object side with respect to the reflecting surface. More specifically, the object-side surface (entrance surface) of the prism is defined by a surface concave on the object side, i.e., a diverging surface. It is here to be noted that when the surface nearest to the object side of the lens system is concave on the object side, various off-axis aberrations inclusive of distortion are likely to occur. It is thus preferable to form the concave surface nearest to the object side with a surface that is not just aspheric but also decreases in curvature with distance from the optical axis.

To slim down the lens group G1, it is also required to satisfy such conditions regarding sites other than the lens group G1 as set forth below. As already described, the entrance pupil should preferably be located at as shallow a position as possible; that is, an optical path length from the surface nearest to the object side to an aperture stop should preferably be reduced as much as possible. To this end, it is desired that the aperture stop be located on an image side of the zoom lens with respect to the reflecting surface, and that the number of lens elements interposed between the reflecting surface and the aperture stop be limited to at most three. In other words, the number of the lens elements interposed between them should be limited to that needed for zooming, and reduction of chromatic aberrations occurring upon zooming as well, with correction of the rest of aberrations with the refractive index of the medium and aspheric surfaces. Thus, three or more aspheric surfaces should preferably be used between the reflecting surface and the aperture stop.

If the depth dimension of a zoom lens is too much diminished at the cost of a sensible phototaking angle of view, it will make little or no sense. For the zoom lens of the invention, therefore, it is preferable to have a distortion-conscious diagonal angle of view of at least 65° on the object side at the wide-angle end (with practical distortion taken into account). Without satisfying such requirements, any slimmed-down, wide-angle arrangement will make no difference.

Further, it is preferable to bend the optical path in the short-side direction of the image pickup plane of an associated electronic image pickup device. Conversely speaking, the electronic image pickup device should preferably be positioned such that the short-side direction of the image pickup plane is substantially parallel with the direction of an optical path portion on an object side of the zoom lens with respect to the position where the optical path is bent, so that it is easy to slim down the optical system and ensure any desired angle of view.

Alternatively, if some large barrel distortion is intentionally imparted to the zoom lens, too, it is easy to ensure any desired angle of view. In this case, image data obtained at the electronic image pickup device is subjected to image processing for correction of that distortion. More specifically, image data with corrected distortion are obtained as output by electronically changing image distortion due to optical distortion.

As described above, slimming-down is achievable by location of the reflecting surface in the lens group G1, and some elaborations ensure to achieve further thickness reductions while keeping wide angles of view. In the zoom lens of the invention, the first lens group G1 has positive refracting power, and is not designed to move toward an image plane for zooming purposes. In addition, the lens group G1 is designed such that on the object side with respect to the reflecting surface there is a negative composite refracting power and on the image side with respect to the reflecting surface there is a positive composite power.

The zoom lens of the invention further comprises a moving lens group $V_1$ having negative refracting power and a lens group $V_2$ having positive refracting power in order from the object side along the optical path. The lens group $V_2$ moves monotonously toward the object side upon zooming from a wide-angle end to a telephoto end of the zoom lens. For this arrangement, it is preferable to satisfy conditions (3) and (4) with respect to the magnifications of the moving lens groups $V_1$ and $V_2$ when the zoom lens system is in a wide-angle end state, for efficient zooming while the entrance pupil is at as shallow a position as possible.

$$-1.0 \leq \beta_{1W} \leq -0.40 \quad (3)$$

$$-1.0 \leq \beta_{2W} \leq -0.40 \quad (4)$$

Here $\beta_{1W}$ and $\beta_{2W}$ are the magnifications of the lens groups $V_1$ and $V_2$, respectively, at the wide-angle end.

As the lower limit of $-1.0$ to condition (3) is not reached, the zoom ratio by movement of the lens group $V_1$ tends to become low, and as the upper limit of $-0.40$ is exceeded, the zoom ratio by movement of the lens group $V_2$ tends to become low. Insofar as condition (3) is satisfied, the lens group $V_2$ could have a magnification as defined by condition (4). More preferably, at least one of conditions (3') and (4') should be satisfied.

$$-0.9 \leq \beta_{1W} \leq -0.45 \quad (3')$$

$$-0.9 \leq \beta_{2W} \leq -0.45 \quad (4')$$

Even more preferably, at least one of conditions (3") and (4") should be satisfied.

$$-0.8 \leq \beta_{1W} \leq -0.5 \quad (3'')$$

$$-0.8 \leq \beta_{2W} \leq -0.5 \quad (4'')$$

As described above, the lens group G1 is likely to become bulky depending mainly on the bending of the optical path and the height of light rays. To reduce the thickness of the lens group G1 as much as possible, it is of vital importance to place the entrance pupil at as shallow a position as possible. To this end, it is significantly important to minimize the number of optical components as far as the aperture stop. The lens groups on the object side with respect to the aperture stop should preferably be each comprised of a diverging component and a converging component in order from the object side along the optical path. Referring here to the zoom lens of the invention, the total number of lens components in the lens groups $G_1$ and $V_1$ is just four.

In the zoom lens of the invention, an image point formed by a combined system of the lens groups $G_1$ and $V_1$ (i.e., an object point for a combined system of the lens group $V_2$ and so on) is likely to come close to a subject side. This renders the combined system of the lens group $V_2$ and so on likely to have a lower magnification; even with an increased amount of movement of the lens groups, it is quite difficult to obtain high magnifications. It is thus required that the lens group $V_2$ have as strong a power as possible and the principal points be located as near to the object side as possible. Specifically, the lens group $V_2$ is made up of a positive lens, a positive lens and a negative lens, wherein the negative lens of high sensitivity to decentration is cemented to the positive lens just before it. In the lens group $V_1$, too, a double-concave lens is used as a negative lens in order to enhance negative refracting power while the number of components is reduced. In other words, the lens group $V_1$ is made up of two lenses, i.e., a double-concave lens and a positive lens, as viewed from the object side along the optical path. More specifically, the lens group $V_2$ is preferably made up of two groups/three lenses, i.e., a positive single lens and a cemented lens component of a positive lens and a negative lens having a stronger concave surface on its image side, as viewed from the object side along the optical path.

Between the lens group $V_1$ and $V_2$ there is further interposed an aperture stop that is substantially fixed in position with respect to the image plane. Preferably in this case, one prism element and three or less single lenses are positioned on an entrance optical path side with respect to the aperture stop.

Preferable in view of correction of aberration fluctuations with zooming, a total of four aspheric surfaces are used for the lens groups $V_1$ and $V_2$ or two aspheric surfaces are used for each of the lens groups $V_1$ and $V_2$.

Referring here to an electronic imaging system, an image formed through a zoom lens is picked up at an electronic image pickup device. With the electronic imaging system, the picked-up image data may be subjected to image processing, for instance, by changing distortion. The electronic imaging system produces image data output upon such image processing. When the zoom lens of the invention is built in such an electronic imaging system, it is preferable for that zoom lens to satisfy condition (5) upon focusing on an object point substantially at infinity.

$$0.8 < y_{07}/(f_W \tan \omega_{07W}) < 0.96 \quad (5)$$

Here, given that $y_{10}$ is a distance (maximum image height) from a center lying within an effective image pickup plane of the electronic image pickup device (capable of picking up images) to the farthest point, $y_{07} = 0.7 y_{10}$, and $\omega_{07W}$ is an angle with the optical axis, at the wide-angle end, of an object point direction corresponding to an image point connecting a center on the image pickup plane with a position of $Y_{07}$.

The principal objective of intentionally producing distortion at a focal length at or near the wide-angle end thereby subjecting a picked-up image to electrical image processing for correction of that distortion is to allow the optical system to have more reduced depth dimension and a wider-angle arrangement (having a distortion-conscious vertical angle of view of at least 38°). This enables the optical system to take in information having a wider angle of view without making it bulkier. Then, a barrel form of distorted image is photo-electronically converted at the electronic image pickup device into image data, which are in turn processed (image processing) at a signal processing component of the electronic imaging system for shape changes, yielding an image with corrected optical distortion. In consequence, the image data finally obtained from the electronic imaging system yields an image on a display device, which is substantially similar to the shape of the subject.

Here, when the formed infinity object image is free of distortion, $$f = y/\tan \omega$$

where y is a height of the image point from the optical axis, f is a focal length of the image-formation system, and ω is an angle with the optical axis of an object point direction corresponding to the image point connecting the center on the image pickup plane with the position of y. When the image-formation optical system shows barrel distortion, f becomes $$f > y/\tan \omega$$

It follows that given that f and y are constant, ω takes a large value.

Condition (5) defines the degree of barrel distortion at the wide-angle end at the time of zooming. If the degree of barrel distortion is approximately 1 exceeding the upper limit of 0.96, it implies that the distortion is optically well corrected. However, this is by no means favorable for capturing an image over a wide angle of view with the compactness of the optical system kept intact. As the lower limit of 0.8 is not reached, there is noticeable sharpness deterioration of the peripheral area of the image when image distortion due to distortion in the optical system is corrected by image processing, because the rate of enlargement of the peripheral area of the image becomes too high in radial directions.

It is more preferable to satisfy the following condition:

$$0.85 < y_{07}/(f_W \tan \omega_{07W}) < 0.95 \quad (5')$$

It is even more preferable to satisfy the following condition:

$$0.88 < y_{07}/(f_W \tan \omega_{07W}) < 0.94 \quad (5'')$$

The first electronic imaging system of the invention comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6 f_W < d < 1.5 f_W \quad (1)$$

where $f_W$ is a focal length of a zoom lens system at a wide-angle end thereof, and $\underline{d}$ is a length as measured along said optical path from an apex of a surface nearest to said object in said lens group nearest to said object to said reflecting surface, and said electronic image pickup device comprises an image pickup plane having a long-side direction and a short-side direction, wherein said short-side direction of said image pickup plane is substantially parallel with an optical axis portion on an object side of the zoom lens with respect to the position where the optical path is bent.

The second electronic imaging system of the invention comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6 f_W < d < 1.5 f_W \quad (1)$$

where $f_W$ is a focal length of a zoom lens system at a wide-angle end thereof, and $\underline{d}$ is a length as measured along said optical path from an apex of a surface nearest to the object in said lens group nearest to the object to said reflecting surface, and said electronic image pickup device comprises an image pickup plane having a long-side direction and a short-side direction, wherein said short-side direction of said image pickup plane is substantially parallel with an optical axis portion on an object side of the zoom lens with respect to the position where the optical path is bent.

The third electronic imaging system of the invention comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6 f_W < d < 1.5 f_W \quad (1)$$

$$1.2 f_W < a < 3.0 f_W \quad (2)$$

where $f_W$ is a focal length of a zoom lens system at a wide-angle end thereof, $\underline{d}$ is a length as measured along said optical path from an apex of a surface nearest to the object in said lens group nearest to the object to said reflecting surface, and $\underline{a}$ is a dimension of said outside shape of said positive lens in a direction parallel with an optical path portion on an object side of the zoom lens with respect to a position where said optical path is bent, and said electronic image pickup device comprises an image pickup plane having a long-side direction and a short-side direction, wherein said short-side direction of said image pickup plane is substantially parallel with an optical axis portion on an object side of the zoom lens with respect to the position where the optical path is bent.

The fourth electronic imaging system of the invention comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6f_W < d < 1.5f_W \quad (1)$$

where $f_W$ is a focal length of a zoom lens system at a wide-angle end thereof, and $\underline{d}$ is a length as measured along said optical path from an apex of a surface nearest to said object in said lens group nearest to said object to said reflecting surface, and further comprises an image processing system for applying distortion-compensation image processing to image data obtained by picking up an image at said electronic image pickup device for producing image data output with changed distortion.

The fifth electronic imaging system of the invention comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6f_W < d < 1.5f_W \quad (1)$$

where $f_W$ is a focal length of a zoom lens system at a wide-angle end thereof, and $\underline{d}$ is a length as measured along said optical path from an apex of a surface nearest to the object in said lens group nearest to the object to said reflecting surface, and further comprises an image processing system for applying distortion-compensation image processing to image data obtained by picking up an image at said electronic image pickup device for producing image data output with changed distortion.

The sixth electronic imaging system of the invention comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6f_W < d < 1.5f_W \quad (1)$$

$$1.2f_W < a < 3.0f_W \quad (2)$$

where $f_W$ is a focal length of a zoom lens system at a wide-angle end thereof, $\underline{d}$ is a length as measured along said optical path from an apex of a surface nearest to the object in said lens group nearest to the object to said reflecting surface, and $\underline{a}$ is a dimension of said outside shape of said positive lens in a direction parallel with an optical path portion on an object side of the zoom lens with respect to a position where said optical path is bent, and further comprises an image processing system for applying distortion-compensation image processing to image data obtained by picking up an image at said electronic image pickup device for producing image data output with changed distortion.

To enable a tradeoff between a wide angle of view and compactness, it is preferable to effect image processing.

To this end, the seventh electronic imaging system of the invention comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface along said optical path toward an image side of the zoom lens, and further comprises an image processing system for applying distortion-compensation image processing to image data obtained by picking up an image at said electronic image pickup device for producing image data output with changed distortion, wherein:

said zoom lens satisfies condition (1):

$$0.6f_W < d < 1.5f_W \quad (1)$$

where $f_W$ is a focal length of a zoom lens system at a wide-angle end thereof, and $\underline{d}$ is a length as measured along said optical path from an apex of a surface nearest to the object in said lens group nearest to the object to said reflecting surface, or condition (5):

$$0.8 < y_{07}/(f_W \tan \omega_{07W}) < 0.96 \quad (5)$$

where, given that $y_{10}$ is a distance (maximum image height) from a center lying within an effective image pickup plane of the electronic image pickup device (capable of picking up images) to the farthest point, $y_{07} = 0.7y_{10}$, and $\omega_{07W}$ is an angle with the optical axis, at the wide-angle end, of an object point direction corresponding to an image point connecting a center on the image pickup plane with a position of $y_{07}$, or said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, or said lens group nearest to the object has positive refracting power.

According to the invention, it is possible to achieve a zoom lens whose depth dimension is much reduced while high optical specification performance such as wider angles of views is ensured, and it is possible to slim down an electronic imaging system incorporating the same, or it is possible to provide an electronic imaging system that can offer a reasonable tradeoff between a wide angle of view and compactness.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
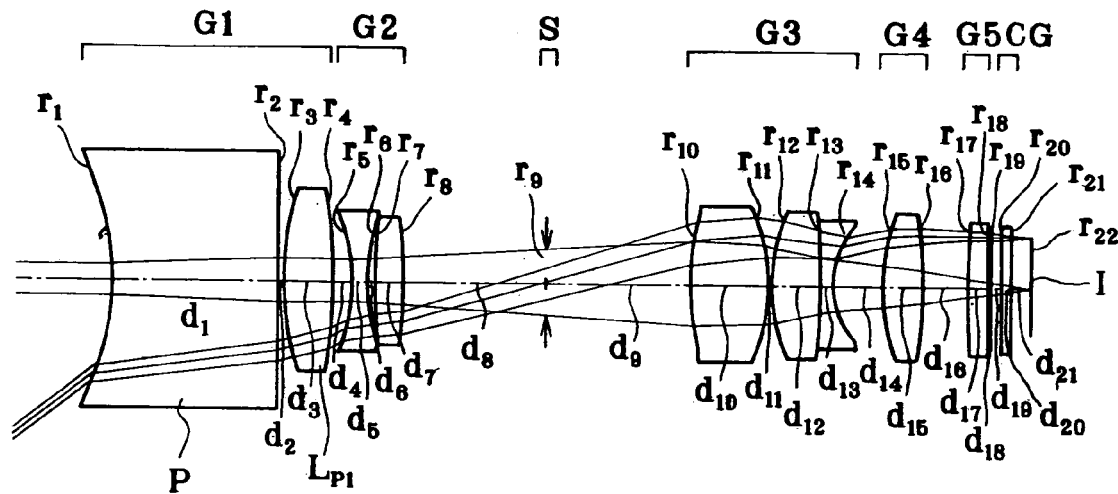
FIGS. 1(a), 1(b) and 1(c) are illustrative in lens arrangement section of Example 1 of the inventive zoom lens at a wide-angle end (a), in an intermediate state (b) and at a telephoto end (c), respectively, upon focusing on an object point at infinity.
Figure 1B:
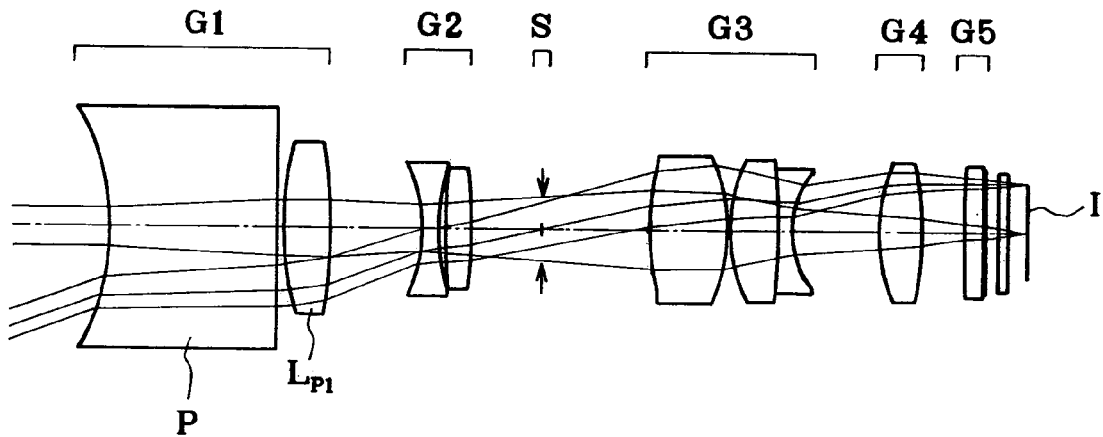
Figure 1C:
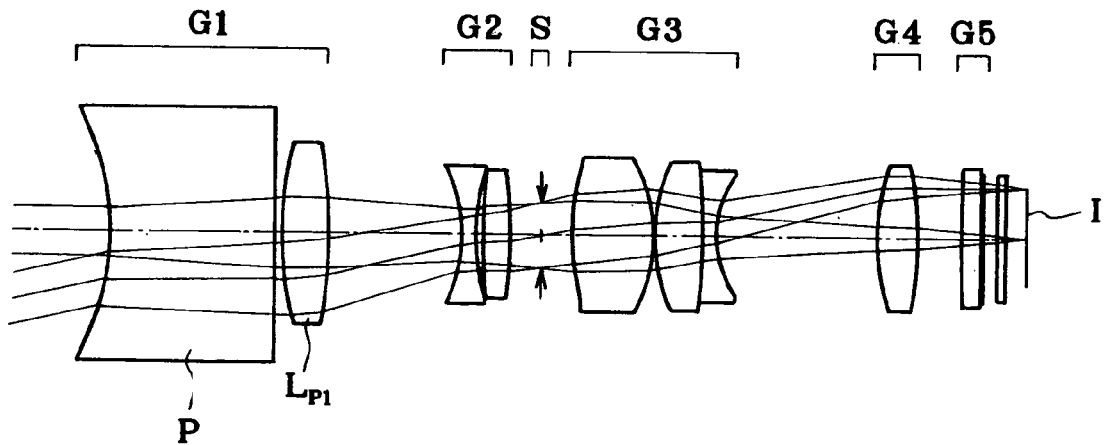

Example 1 of the optical path-bent type zoom lens of the invention is now explained. FIGS. 1(a), 1(b) and 1(c) are illustrative in lens arrangement section of Example 1 at the wide-angle end (a), in the intermediate state (b) and at the telephoto end (c) upon focusing on an object point at infinity. Throughout FIGS. 1(a), 1(b) and 1(c), the first lens group (corresponding the lens group $G_1$) is indicated at G1, the second lens group (corresponding to lens group $V_1$) at G2, an aperture stop at S, the third lens group (corresponding to the lens group $V_2$) at G3, the fourth lens group at G4, and the fifth lens group at GS. A cover glass of CCD that is an electronic image pickup device is indicated at CG, and an image plane of CCD at I. It is here noted that an optical path-bending prism (hereinafter referred to as the prism for short) is located in the first lens group G1. Throughout FIGS. 1(a), 1(b) and 1(c), the prism is shown at P in a taken-apart state.

Figure 2:
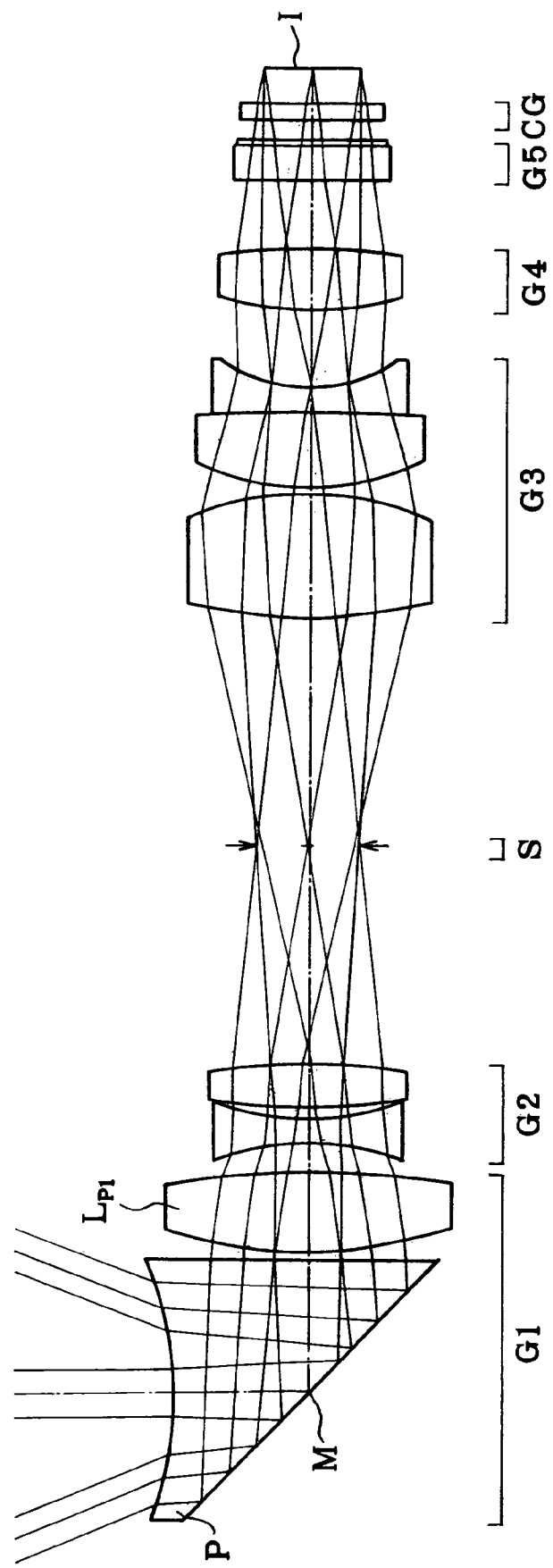
FIG. 2 is an optical path diagram for Example 1 of the inventive zoom lens at the wide-angle end, wherein an optical path is bent upon focusing on an object point at infinity.

FIG. 2 is an optical path diagram for Example 1 of the zoom lens upon bending. In FIG. 2, the zoom lens is at the wide-angle end upon focusing on an infinite object point. The prism P in the first lens group G1 acts as a reflecting prism for bending the optical path 90° at a reflecting surface M.

Figure 3:
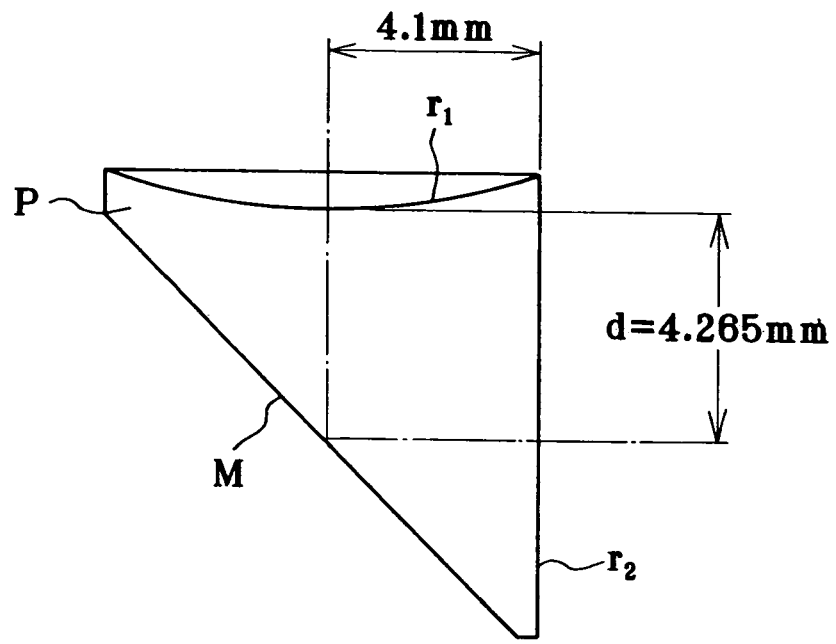
FIG. 3 is a sectional view of a length d along the optical path from the apex of the surface located nearest to the object side of an optical path-bending prism to the reflecting surface in Example 1, and a distance as measured along the optical axis from the reflecting surface to the exit surface in the prism.

FIG. 3 is a sectioned view illustrative of the length d of prism P as measured along the optical path from the apex of the surface nearest to the object side to the reflecting surface M, and a distance of the prism P as measured along the optical path from the reflecting surface M to the exit surface in the prism P.

Figures 4A, 4B:
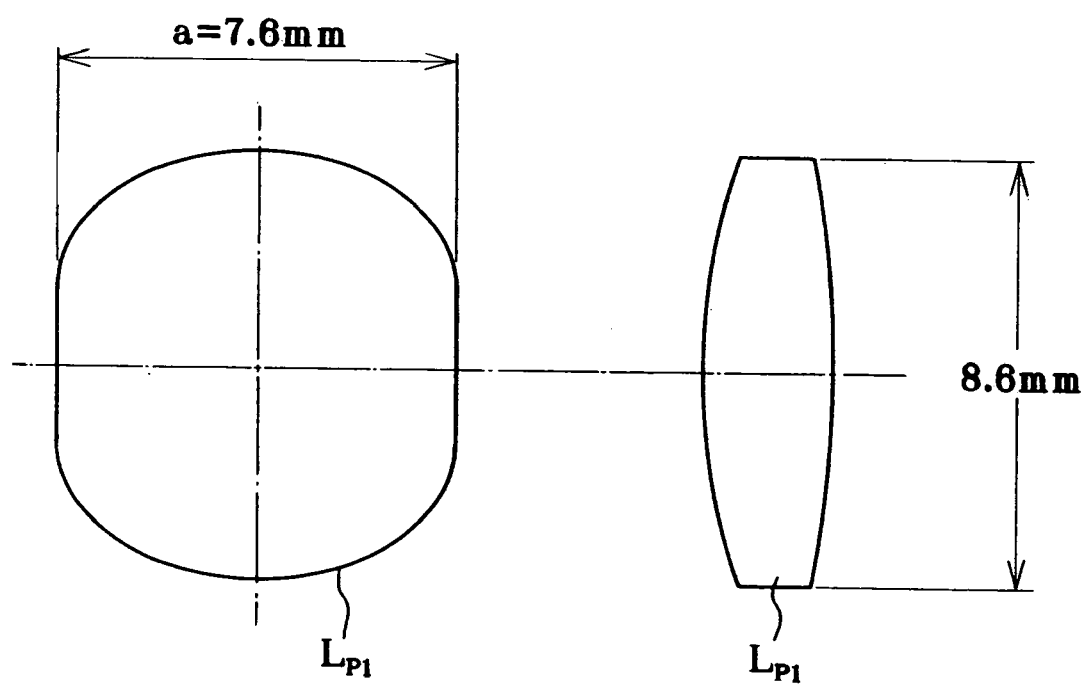
FIGS. 4(a) and 4(b) are a front view (a) and a sectional view (b) showing a dimension a of a positive lens just after the optical path-bending prism in the first lens group of Example 1 in a direction parallel with an optical path portion on an object side of the zoom lens with respect to the reflecting surface and a diametrical dimension of a circular portion of the outside shape of the positive lens.

FIG. 4 is indicative of the dimension a of a positive lens $L_{P1}$ located just after the prism P in a direction parallel with an optical axis portion on an object side of the zoom lens with respect to the reflecting surface M, and a diametrical dimension of a circular portion of the outside shape of the positive lens $L_{P1}$. Here, FIGS. 4(a) and 4(b) are a front view and a side view, respectively.

As shown in FIGS. 1(a), 1(b) and 1(c), the zoom lens of Example 1 is made up of the first lens group G1, the second lens group G2, the aperture stop S, the third lens group G3, the fourth lens group G4 and the fifth lens group G5. Here the first lens group G1 consists of the prism P and the double-convex positive lens $L_{P1}$. The prism P is taken apart into a plano-concave negative lens concave on its object side. The second lens group G2 consists of a double-concave negative lens and a double-convex positive lens. The third lens group G3 consists of a double-convex positive lens and a doublet of a double-convex positive lens and a double-concave negative lens. The fourth lens group G4 consists of one double-convex positive lens. The fifth lens group G5 consists of one plano-convex positive lens. Upon zooming from the wide-angle end to the telephoto end, the first lens group G1 remains fixed, the aperture stop S remains substantially fixed, the second lens group G2 moves toward an image plane side of the zoom lens, the third lens group G3 moves toward an object side of the zoom lens, the fourth lens group G4 moves slightly in a convex locus toward the image plane side, and the fifth lens group G5 stays fixed. It is here noted that the fourth lens group G4 is positioned nearer to the object side at the telephoto end than at the wide-angle end.

Six aspheric surfaces are used; one at the entrance concave surface of the prism P, one at the entrance-side surface of the double-convex positive lens in the first lens group G1, two at both surfaces of the double-concave negative lens in the second lens group G2, one at the object-side surface of the double-convex positive lens in the third lens group G3, and one at the surface nearest to the object side in the doublet in the third lens group G3.

The image-side plane of the plano-convex positive lens that forms the fifth lens group G5 is provided with an optical function film such as a low-pass filter or an infrared sharp cut coating.

Given below are numerical data on Example 1. The symbols used hereinafter but not hereinbefore means:

f: focal length of the zoom lens, $F_{NO}$: F-number,

WE: wide-angle end,

ST: intermediate state,

TE: telephoto end, $r_1, r_2, \ldots$ : radius of curvature of each lens surface, $d_1, d_2, \ldots$ : spacing between adjacent lens surfaces, $n_{d1}, n_{d2}, \ldots$ : d-line refractive index of each lens, and $\nu_{d1}, \nu_{d2}, \ldots$ : Abbe number of each lens.

It is here noted that given that x is an optical axis provided that the direction of propagation of light is positive and y is a direction orthogonal to the optical path, aspheric shape is expressed by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and A4, A6, A8 and A10 are the $4^{th}$-, $6^{th}$-, $8^{th}$- and $10^{th}$-order aspherical coefficients, respectively.

EXAMPLE 1

| | | | |
|---|---|---|---|
| $r_1 = -8.6616$ (Aspheric) | $d_1 = 8.3650$ | $n_{d1} = 1.84666$ | $v_{d1} = 23.78$ |
| $r_2 = \infty$ | $d_2 = 0.1500$ | | |
| $r_3 = 11.3272$ (Aspheric) | $d_3 = 2.5000$ | $n_{d2} = 1.83400$ | $v_{d2} = 37.16$ |
| $r_4 = -28.0035$ | $d_4 =$ (Variable) | | |
| $r_5 = -6.9944$ (Aspheric) | $d_5 = 0.8000$ | $n_{d3} = 1.74320$ | $v_{d3} = 49.34$ |
| $r_6 = 10.3245$ (Aspheric) | $d_6 = 0.3000$ | | |
| $r_7 = 23.3243$ | $d_7 = 1.4000$ | $n_{d4} = 1.84666$ | $v_{d4} = 23.78$ |
| $r_8 = -22.7503$ | $d_8 =$ (Variable) | | |
| $r_9 = \infty$ (Stop) | $d_9 =$ (Variable) | | |
| $r_{10} = 10.6499$ (Aspheric) | $d_{10} = 3.9944$ | $n_{d5} = 1.69350$ | $v_{d5} = 53.21$ |
| $r_{11} = -8.5314$ | $d_{11} = 0.1500$ | | |
| $r_{12} = 10.1912$ (Aspheric) | $d_{12} = 2.3583$ | $n_{d6} = 1.58913$ | $v_{d6} = 61.14$ |
| $r_{13} = -65.3236$ | $d_{13} = 0.7000$ | $n_{d7} = 1.84666$ | $v_{d7} = 23.78$ |
| $r_{14} = 4.5704$ | $d_{14} =$ (Variable) | | |
| $r_{15} = 9.8095$ | $d_{15} = 2.0000$ | $n_{d8} = 1.48749$ | $v_{d8} = 70.23$ |
| $r_{16} = -17.4974$ | $d_{16} =$ (Variable) | | |
| $r_{17} = 61.3735$ | $d_{17} = 1.1000$ | $n_{d9} = 1.68893$ | $v_{d9} = 31.07$ |
| $r_{18} = \infty$ | $d_{18} = 0.1000$ | $n_{d10} = 1.51633$ | $v_{d10} = 64.14$ |
| $r_{19} = \infty$ | $d_{19} = 0.6000$ | | |
| $r_{20} = \infty$ | $d_{20} = 0.5000$ | $n_{d11} = 1.51633$ | $v_{d11} = 64.14$ |
| $r_{21} = \infty$ | $d_{21} = 1.0300$ | | |
| $r_{22} = \infty$ (Image plane) | | | |

Aspherical Coefficients

1st surface $K = 0$
$A_4 = 9.2025 \times 10^{-4}$
$A_6 = -1.0055 \times 10^{-5}$
$A_8 = 1.0318 \times 10^{-7}$
$A_{10} = 0.0000$ 3re surface $K = 0$
$A_4 = -4.2567 \times 10^{-4}$
$A_6 = 1.3244 \times 10^{-6}$
$A_8 = 2.1981 \times 10^{-8}$
$A_{10} = 0.0000$ 5th surface $K = 0$
$A_4 = 1.2947 \times 10^{-3}$
$A_6 = 2.0949 \times 10^{-5}$
$A_8 = -1.0244 \times 10^{-6}$
$A_{10} = 0.0000$ 6th surface $K = 0$
$A_4 = 2.9049 \times 10^{-4}$
$A_6 = 4.8291 \times 10^{-5}$
$A_8 = -2.0307 \times 10^{-6}$
$A_{10} = 0.0000$ 10th surface $K = 0$
$A_4 = -9.8018 \times 10^{-4}$ -continued $A_6 = -2.1688 \times 10^{-5}$
$A_8 = 4.9020 \times 10^{-7}$
$A_{10} = 0.0000$ 12th surface $K = 0$
$A_4 = 3.0365 \times 10^{-4}$
$A_6 = 2.8850 \times 10^{-5}$
$A_8 = 7.8412 \times 10^{-7}$
$A_{10} = 0.0000$ Zooming Data (∞)

| | WE | ST | TE |
|---|---|---|---|
| f (mm) | 4.15403 | 6.66603 | 11.13572 |
| $F_{NO}$ | 2.8600 | 3.5064 | 4.3811 |
| $d_4$ | 0.93833 | 4.43272 | 6.44034 |
| $d_8$ | 7.00187 | 3.49024 | 1.54359 |
| $d_9$ | 7.27169 | 5.35290 | 1.58245 |
| $d_{14}$ | 2.40541 | 4.35549 | 7.96689 |
| $d_{16}$ | 1.93613 | 1.92168 | 2.02092 |

Half of the distortion-conscious diagonal angle of view (°) (Image height = 2.5 mm)

| Image height ratio | WE | ST | TE |
|---|---|---|---|
| ×1.0 | 36.9 | 20.8 | 12.6 |
| ×0.9 | 32.5 | 18.9 | 11.4 |
| ×0.7 | 24.7 | 14.8 | 8.9 |
| ×0.6 | 21.1 | 12.8 | 7.7 |
| ×0.4 | 13.9 | 8.6 | 5.1 |

Figure 5A:
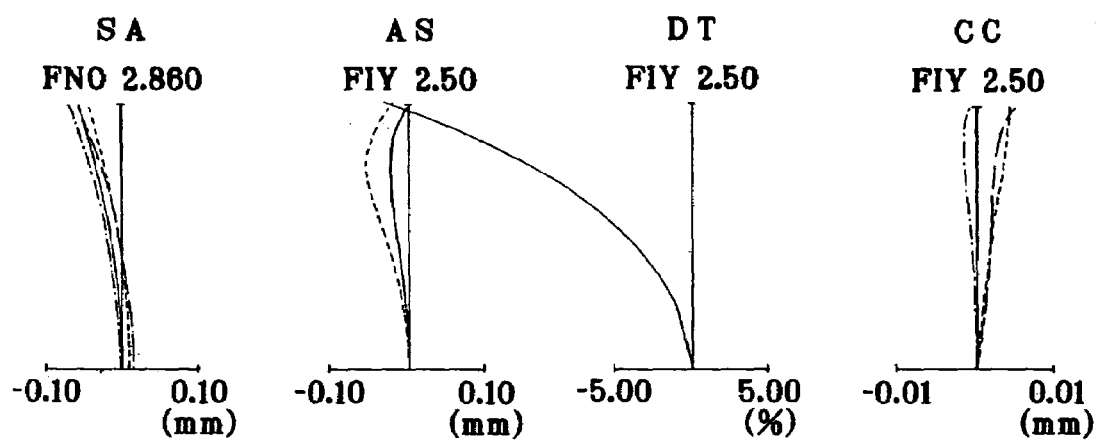
FIGS. 5(a), 5(b) and 5(c) are aberration diagrams for Example 1 at the wide-angle end (a), in the intermediate state (b) and at the telephoto end (c) upon focusing on an object point at infinity.
Figure 5B:
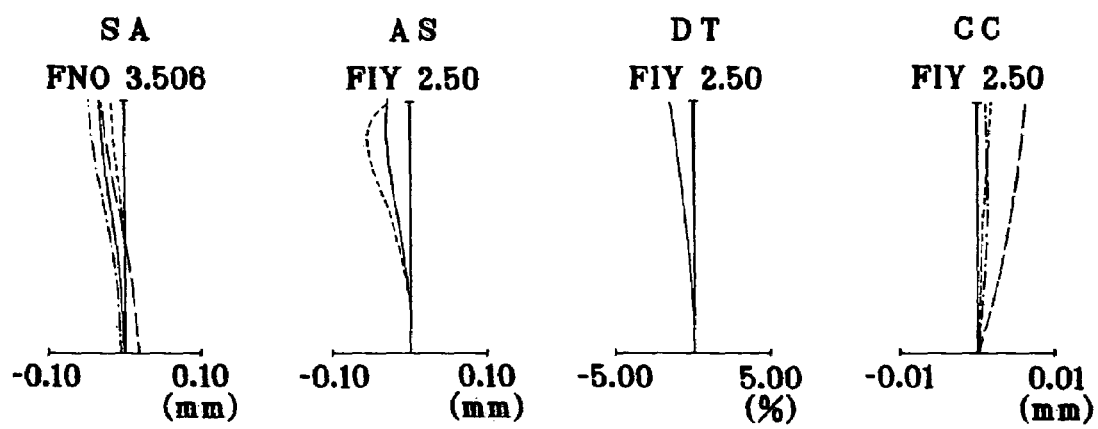
Figure 5C:
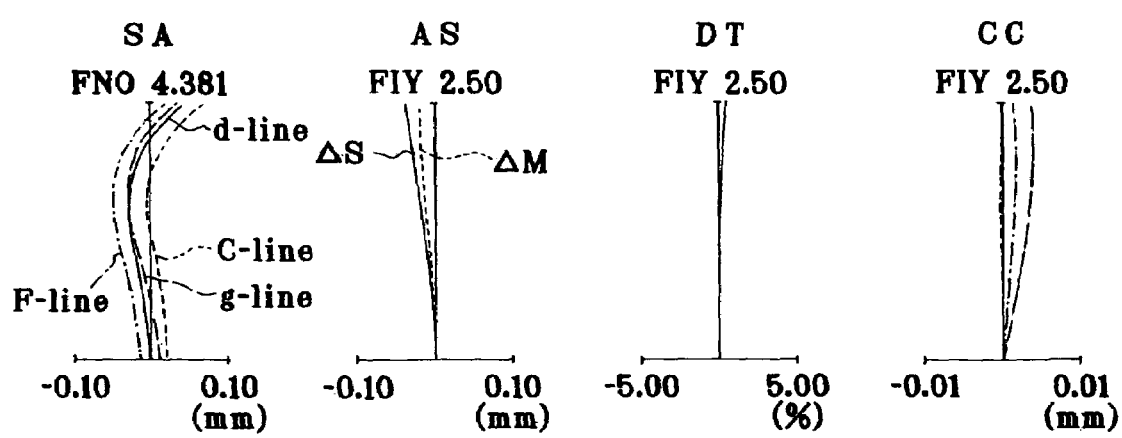

$f_w = 4.15403$
$d = 4.265$
$a = 7.6$
$d/f_w = 1.02671$
$a/f_w = 1.82955$
$\beta_{1w} = -0.61874$
$\beta_{2w} = -0.63064$
$y_{10} = 2.5$
$y_{07} = 1.75$
$\tan \omega_{07w} = 0.46056$
$y_{07}/(f_w \cdot \tan \omega_{07w}) = 0.91471$ FIGS. 5(a), 5(b) and 5(c) are aberration diagrams for Example 1 as described above at the wide-angle end, in the intermediate state and the telephoto end, respectively, upon focusing on an infinite object point. Throughout FIGS. 5(a), 5(b) and 5(c), "SA", "AS", "DT", "CC", and "FIY" are abbreviations of spherical aberrations, astigmatisms, distortions, chromatic aberrations of magnification, and image height, respectively.

Such inventive zoom lenses as described above could all be applied to electronic imaging systems, for example, digital cameras. A zoom lens used with those electronics often must have intentionally some large barrel distortion so as to ensure its angle of view. In such a case, image distortion due to distortion is inherited to images obtained by a CCD that is a typical electronic image pickup device. In other words, such an electronic imaging system must have an image processing function of compensating that distortion. It is then desired that the distortion be changed by the image processing function to make correction for the distortion, thereby producing image data output free of distortion. One exemplary arrangement to this end is now explained.

Figure 6:
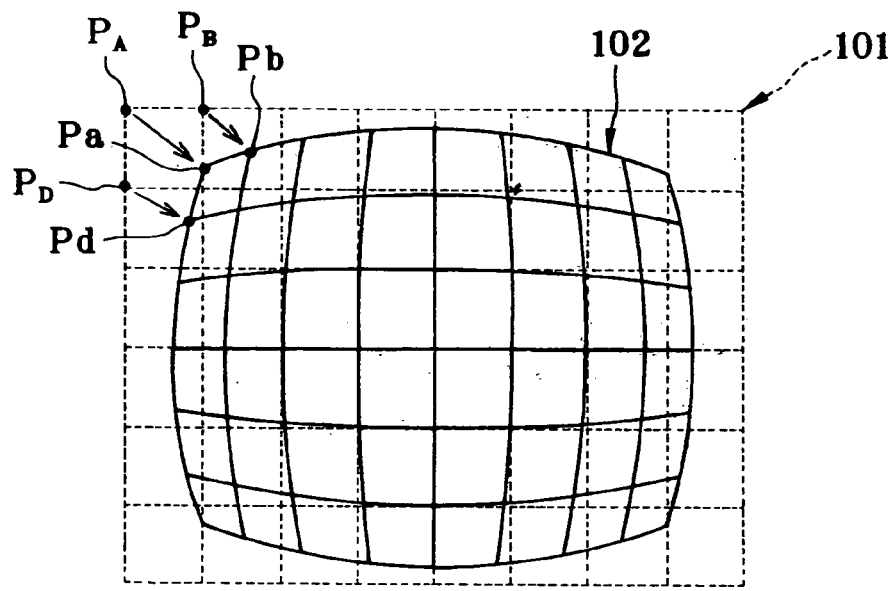
FIG. 6 is an optical distortion diagram illustrative of barrel distortion and an image as it should be on a screen.

As the inventive zoom lens is used with an electronic imaging system, such distortion as referred to above gives distortion to an optical subject image formed on an electronic image pickup device. With subject image information gained via the electronic image pickup device, accordingly, distortion information is also captured in image signal output from that electronic image pickup device. In other words, distorted image data are taken in the electronic image pickup device. One exemplary optical distortion is such barrel distortion as shown in FIG. 6. With such barrel distortion, for instance, an image to be by definition formed on a screen position 101 as indicated by broken lines will be formed on a screen position 102 as indicated by solid lines.

To make correction for optically distorted image signals gained via the electronic image pickup device, the image signals are first converted into digital signals for writing to an image memory. Then, the digital signals are read from the image memory depending on distortion characteristics, thereby correcting for distortion on the image memory. Referring here to FIG. 6, a lattice form of image will be formed on the screen position 101 shown by broken lines in the absence of any distortion. In the presence of distortion, on the other hand, that lattice form of image will be formed on the screen position 102 indicated by solid lines. In the zoom lens of the invention wherein optical distortion is produced throughout the optical system, the image 101 indicated by broken lines will be stored in the image memory in the form of the image 102 indicated by solid lines under the influence of the above optical distortion. To make correction for this distortion, the image data-before-correction must be read from the image memory as follows. Image data-before-correction stored at a point $P_a$ is read at timing for reading a $P_A$ point, image data-before-correction stored at a point $P_b$ at timing for reading a $P_B$ point, and image data-before-correction stored at a point $P_d$ at timing for reading a $P_D$ point. In this way, the image 102 before correction can be read as a distortion-free image to be properly formed at the lattice form of screen 101 indicated by broken lines, so that an image with corrected optical distortion can be displayed in place.

Figure 7:
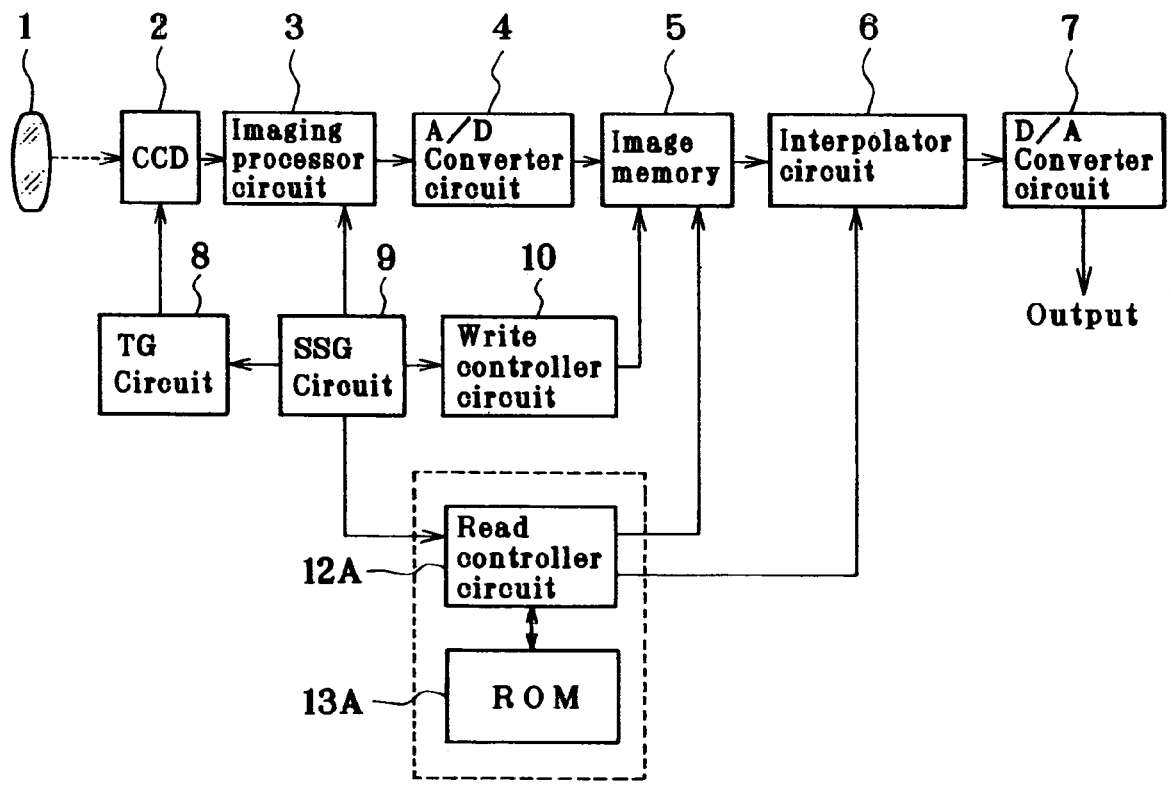
FIG. 7 is a block diagram illustrative of one exemplary image processor for correction of optical distortion.

FIG. 7 is a block diagram illustrative of a unit having an image processing function for correction of optical distortion. Referring to this unit, a subject image is first formed on the image pickup plane of a CCD (electronic image pickup device) 2 via a zoom lens 1 of the invention. Including such optical distortion as described above, the subject image formed on the image pickup plane of CCD 2 is converted into electrical signals at CCD 2. The electrical signals are converted by given processing at an imaging processor circuit 3 into image signals that are then fed to an A/D converter circuit 4 where they are converted into digital signals for storage in an image memory 5. Writing and reading of signals to and from the image memory 5 are controlled by a write controller circuit 10 and a read controller circuit 12A.

It is noted that an SSG (synchronizing signal generator) circuit 9 is operable to generate a reference timing signal. That SSG (synchronizing signal generator) circuit 9 then feeds the reference timing signal to a TG (timing generator) circuit 8 (as described below), the imaging processor circuit 3, the write controller circuit 10 and the read controller circuit 12A. The TG circuit 8 is operable to send read timing signals in the horizontal (H) and vertical (V) directions to CCD 2. Quantitative correction data predetermined for each section of the screen are preloaded in a quantitative corrector ROM 13A. What is loaded as the predetermined quantitative correction, for instance, is a quantitative correction address value for correction of optical distortion, which is determined depending on the relations of positions on the solid lines to positions on the broken lines, as shown in FIG. 6.

Then, signals (data) are read from the image memory 5 via read signal outputs from the read controller circuit 12A. At this time, the signals are read from the image memory 5 for the purpose of correction of optical distortion. The read signals are interpolated at an interpolator circuit 6, and then converted by a D/A converter 7 into analog signals for outputting.

In this connection, it is noted that an image memory (5) mounted on some digital cameras (electronic cameras) has a tight space. In such a case, it is acceptable to change timing by a time length corresponding to the amount of optical distortion to be corrected before the image signals are stored in the image memory 5, that is, when the image signals are read from CCD 2.

Such inventive zoom lenses as described above could be used with phototaking systems wherein an object image formed through an image-formation optical system is received at an image pickup device such as a CCD or a silver-halide film for phototaking purposes, especially digital or video cameras, personal computers that are typical information processors, and telephone sets in general and convenient-to-carry cellular phones in particular.

Figure 8:
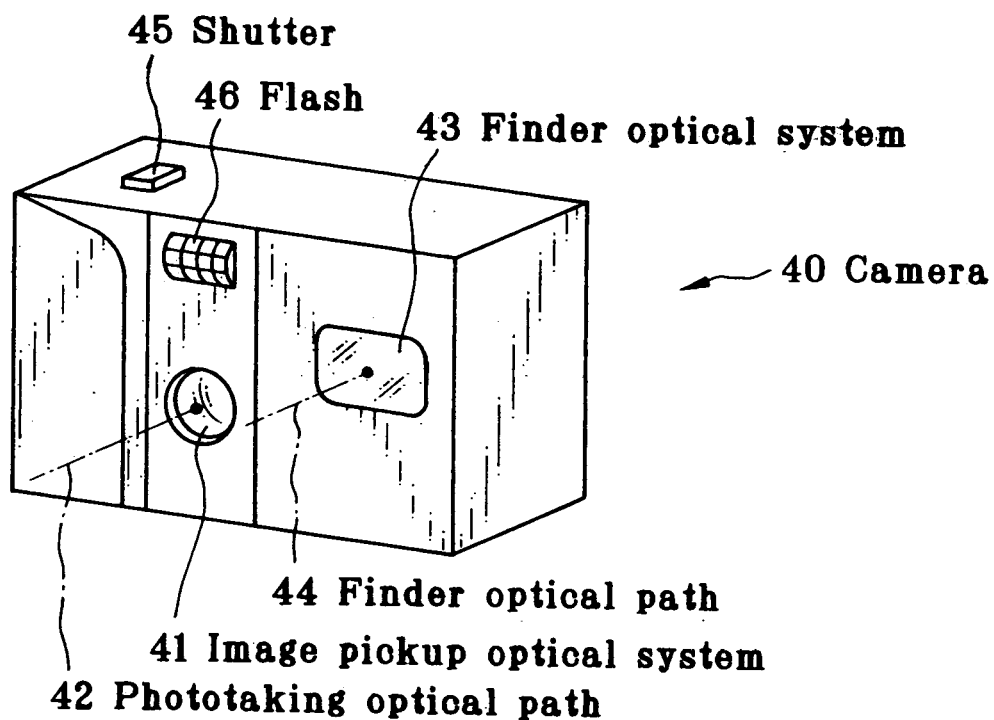
FIG. 8 is a front perspective view of a digital camera with the inventive zoom lens built in it.
Figure 9:
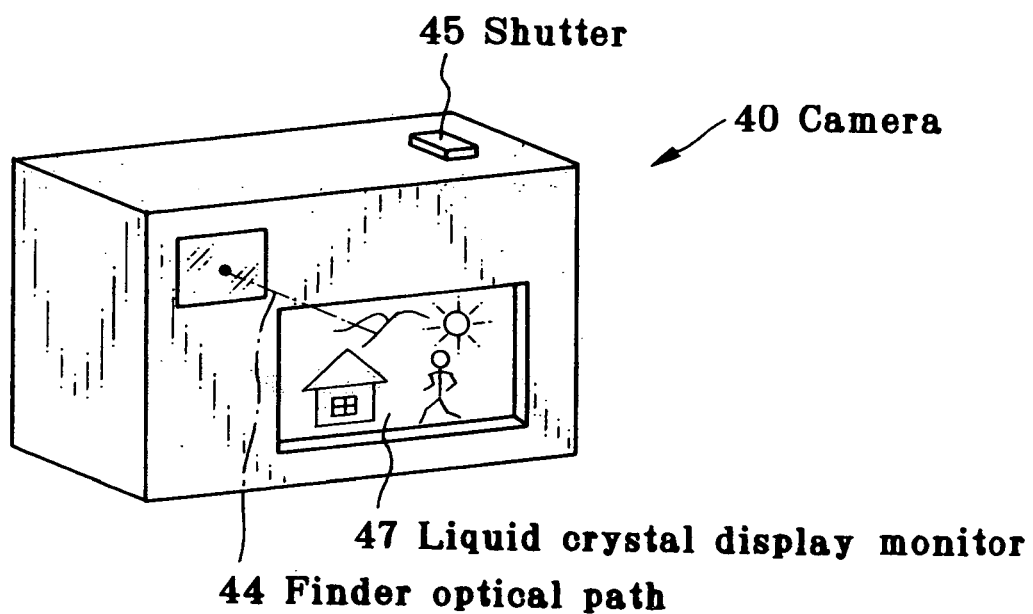
FIG. 9 is a rear perspective view of the digital camera of FIG. 8.
Figure 10:
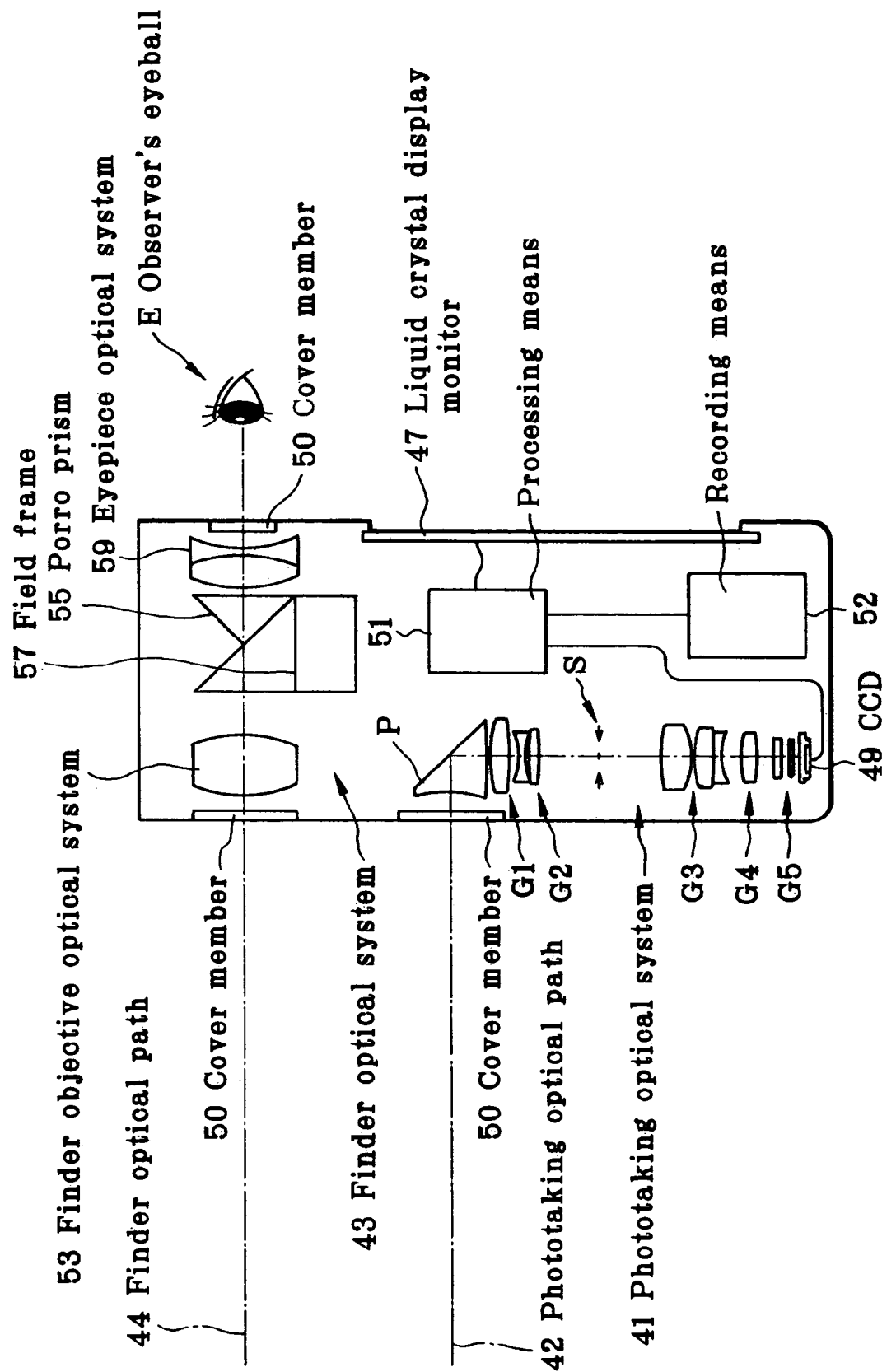
FIG. 10 is a sectioned view of the digital camera of FIG. 8.

FIGS. 8, 9 and 10 are conceptual illustrations of a digital camera, in which the zoom lens of the invention is incorporated as a phototaking optical system 41 thereof. FIG. 8 is a front perspective view of the outward appearance of a digital camera 40, and FIG. 9 is a rear perspective view of the same. FIG. 10 is a horizontally sectioned view of the construction of the digital camera 40. In this embodiment, the digital camera 40 comprises a phototaking optical system 41 having a phototaking optical path 42, a finder optical system 43 having a finder optical path 44, a shutter 45, a flash 46, a liquid crystal monitor 47 and so on. In this case, the optical path is bent by the prism P in the short-axis direction of the digital camera 40, making contribution to slimming down the camera.

The shutter 45 is mounted on an upper portion of the camera 40. As the shutter 45 is pressed down, phototaking takes place through the phototaking optical system 41, for instance, the zoom lens of Example 1. An object image formed by the phototaking optical system 41 is formed on the image pickup plane of a CCD 49. It is here noted that the plano-convex positive lens in the fifth lens group G5 is provided on its image-side plane with a near infrared cut filter and an optical low-pass filter, where superfluous flares and moirés are removed so that an image of good quality can be formed. An object image received at CCD 49 is shown as an electronic image on the liquid crystal monitor 47 via processing means 51, which monitor is mounted on the back of the camera. This processing means 51 could be connected with recording means 52 in which the phototaken electronic image is recordable. It is here noted that the recording means 52 could be provided separately from the processing means 51 or, alternatively, it could be constructed in such a way that images are electronically recorded and written thereon by means of floppy discs, memory cards, MOs or the like. This camera could also be constructed in the form of a silver-halide camera using a silver-halide film in place of CCD 49. It is noted that the processing means 51 is provided with the aforesaid optical distortion-correction image processor.

Moreover, a finder objective optical system 53 is located on the finder optical path 44. An object image formed by that finder objective optical system 53 is in turn formed on a field frame 57, which is attached to a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

In the thus set-up digital camera 40, the photo-taking optical system 41 is a fast zoom lens that has a wide angle of view and a high zoom ratio with all aberrations but distortion well corrected. It is therefore possible to achieve high performance and cost reductions. In addition, the optical path through the zoom lens is selectively bent in the short-axis direction of the digital camera 40, so that the camera can be effectively slimmed down, and the flash 46 can be positioned above the entrance surface of the phototaking optical system 41. It is accordingly possible to lay out the camera in such a way as to mitigate the influences of shadows occurring upon strobe shots of figures.

In the embodiment of FIG. 10, plane-parallel plates are used as the cover members 50; however, it is acceptable to use powered lenses. It is a matter of course that the optical path could be bent in either a longitudinal or transverse direction depending on ease with which the camera can be laid out.

Figure 11:
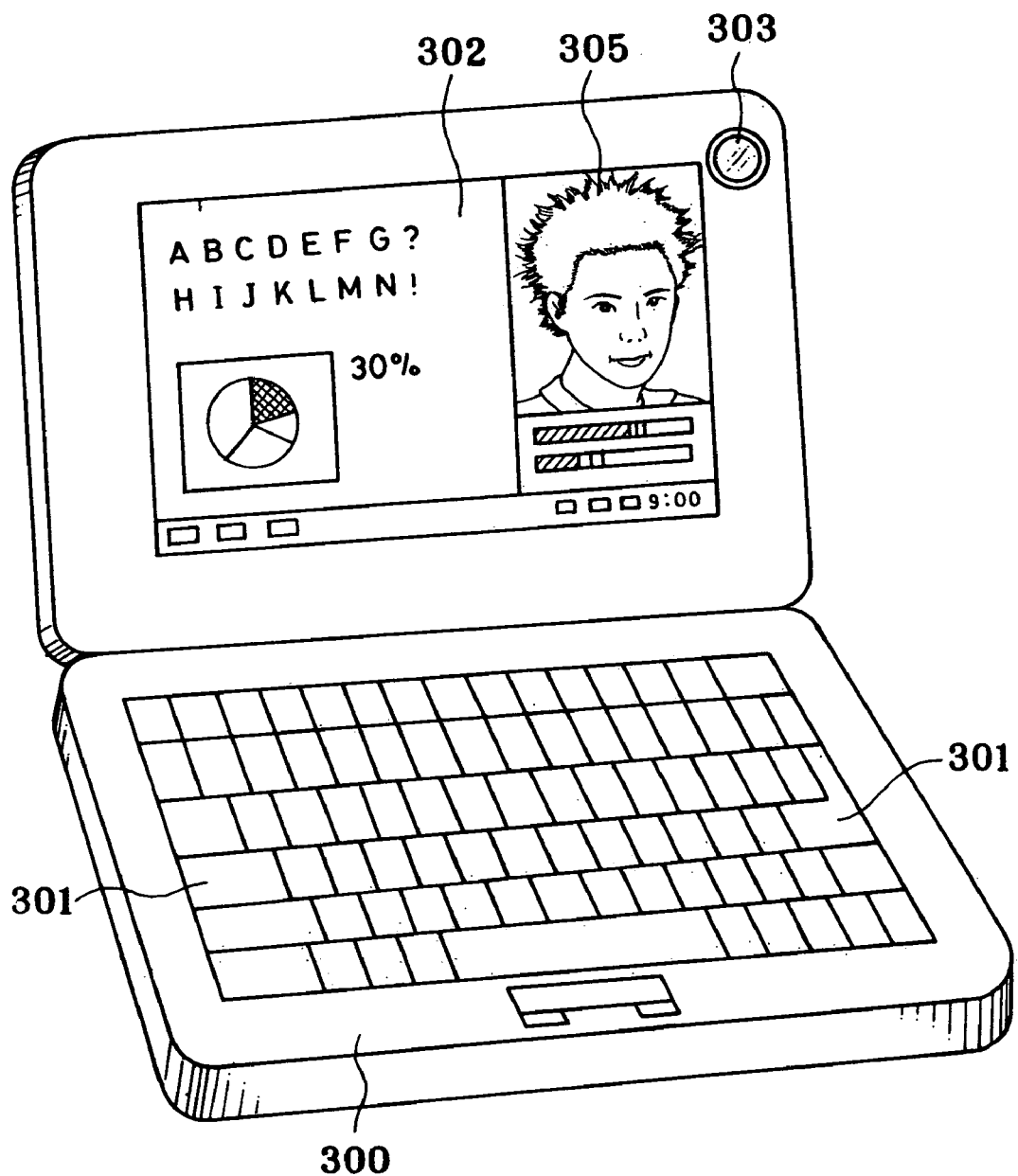
FIG. 11 is a front perspective view of a personal computer with a cover opened out, in which the inventive zoom lens is incorporated as an objective optical system.
Figure 12:
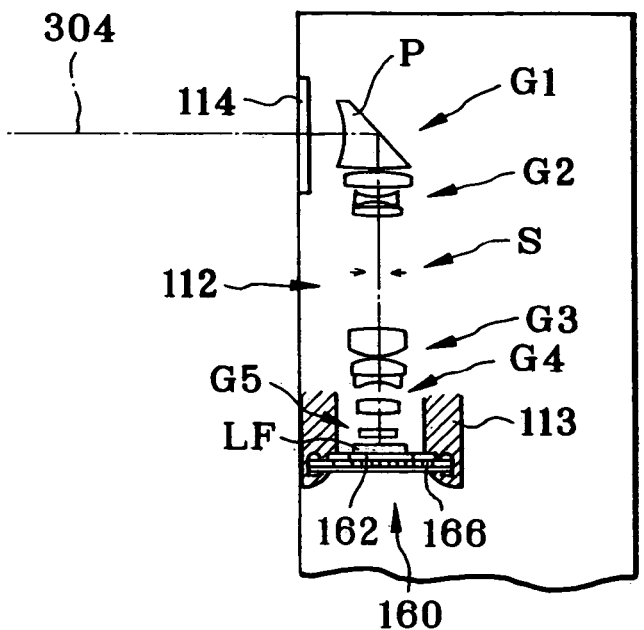
FIG. 12 is a sectioned view of a phototaking optical system in the personal computer.
Figure 13:
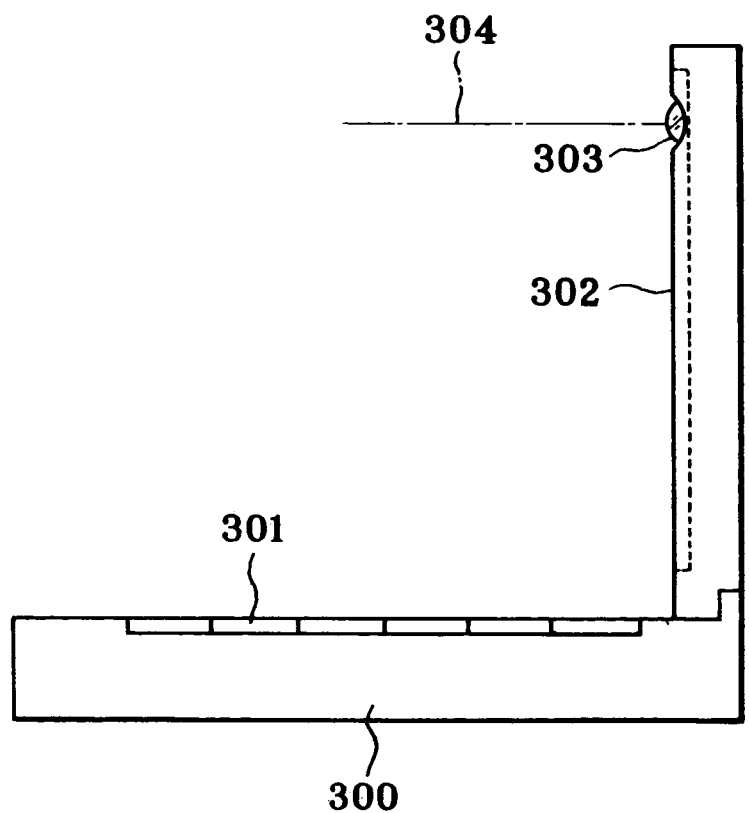
FIG. 13 is a side view of the state depicted in FIG. 11.

FIGS. 11, 12 and 13 are illustrative of a personal computer that is one example of the information processor in which the zoom lens of the invention is built as an objective optical system. FIG. 11 is a front perspective view of a personal computer 300 in use with a cover opened out, FIG. 12 is a sectional view of a phototaking optical system 303 in the personal computer 300, and FIG. 13 is a side view of the state of FIG. 11. As shown in FIGS. 11, 12 and 13, the personal computer 300 comprises a keyboard 301 via which an operator enters information therein from outside, a monitor 302 on which the information is shown for the operator, and a phototaking optical system 303 for taking an image of the operator and surrounding images. For the monitor 302, for instance, use could be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right-upper portion of the monitor 302, it could be located somewhere around the monitor 302 or keyboard 301.

This phototaking optical system 303 comprises, on a phototaking optical path 304, an objective lens 112 typically comprising the zoom lens of the invention and an image pickup device chip 162 for receiving an image. These are built in the personal computer 300. Here an optical low-pass filter LF is additionally applied onto the image pickup device chip 162 to form an integral imaging unit 160, which can be fitted right into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112, although not shown. It is here noted that a driving mechanism for the zoom lens in the lens barrel 113 is not shown.

An object image received at the image pickup device chip 162 is entered via a terminal 166 in the processing means of the personal computer 300, and shown as an electronic image on the monitor 302. As an example, an image 305 taken of the operator is shown in FIG. 11. This image 305 could be shown on a personal computer on the remote other end via suitable processing means and the Internet or telephone line.

Figure 14A:
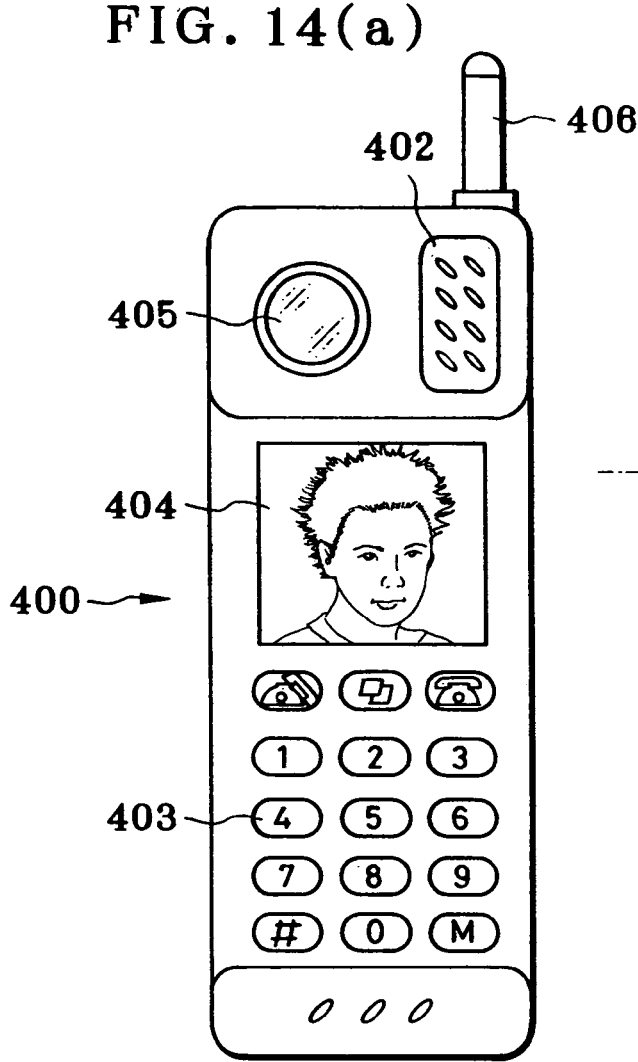
FIGS. 14(a) and 14(b) are a front view (a) and a side view (b) of a cellular phone with the inventive zoom lens incorporated as an objective optical system in it.
Figure 14B:
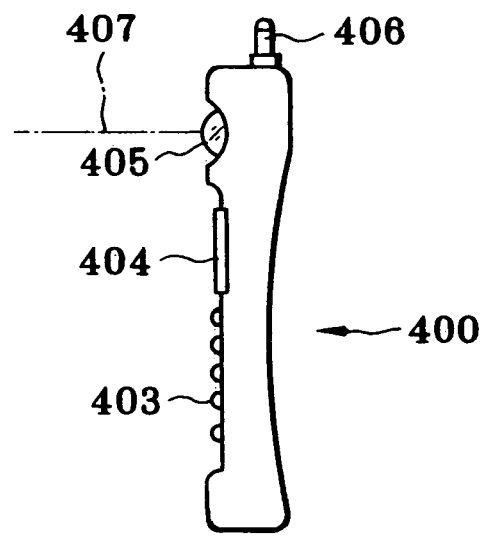
Figure 14C:
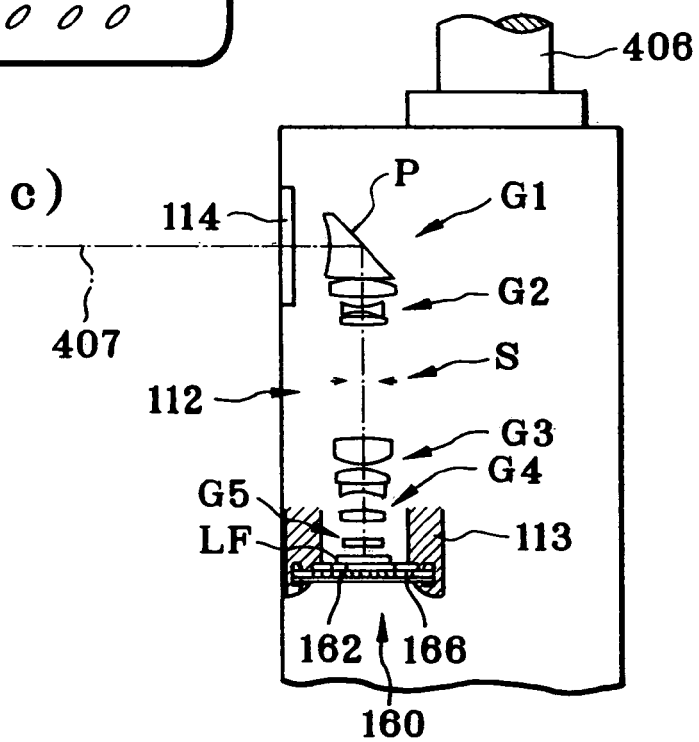
FIG. 14(c) is a sectioned view of a phototaking optical system therein.

FIGS. 14(*a*), 14(*b*) and 14(*c*) are illustrative of a telephone set that is one example of the information processor in which the zoom lens of the invention is built in the form of a phototaking optical system, especially a convenient-to-carry cellular phone. FIG. 14(*a*) and FIG. 14(*b*) are a front view and a side view of a cellular phone 400, respectively, and FIG. 14(*c*) is a sectional view of a phototaking optical system 405. As shown in FIGS. 14(*a*), 14(*b*) and 14(*c*), the cellular phone 400 comprises a microphone 401 for entering the voice of an operator as information, a speaker 402 for producing the voice of the person on the other end, an input dial 403 for allowing the operator to enter the information, a monitor 404, a phototaking optical system 405, and an antenna 406 for transmitting and receiving communications waves. Here the monitor 404 is a liquid crystal display device on which the images taken of the operator, the person on the other end and so on and information such as telephone numbers are indicated. Although not shown, the cellular phone 400 further comprises processing means for processing image information, communications information, input signals an so on. It is noted that the components are not necessarily arranged as shown.

The phototaking optical system 405 includes an objective lens 112 typically comprising the zoom lens of the invention and an image pickup device chip 162 for receiving an object image. These are built in the cellular phone 400. Here an optical low-pass filter LF is additionally applied onto the image pickup device chip 162 to form an integral imaging unit 160, which can be fitted right into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is noted that a driving mechanism for the zoom optical system in the lens barrel 113 is not shown.

An object image received at the image pickup device chip 162 is entered via a terminal 166 in processing means (not shown), so that the object image can be displayed as an electronic image on the monitor 404 and/or a monitor on the other end. The processing means also include a signal processing function for converting information about the object image received at the image pickup device chip 162 into transmittable signals, thereby sending the image to the person on the other end for displaying on a monitor on the other end.

What we claim is:

1. A zoom lens that comprises a lens group located nearest to an object and comprising a reflecting surface for bending an optical path and a positive lens found first as viewed from said reflecting surface along said optical path toward an image side of the zoom lens, wherein:

said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6 f_W < d < 1.5 f_W \qquad (1)$$

where $f_W$ is a focal length of a zoom lens system at a wide-angle end thereof, and d is a length as measured along said optical path from an apex of a surface nearest to the object in said lens group nearest to the object to said reflecting surface.

2. A zoom lens that comprises a lens group located nearest to an object and comprising a reflecting surface for bending an optical path and a positive lens found first as viewed from said reflecting surface along said optical path toward an image side of the zoom lens, wherein:

said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to the object in said lens group nearest to the object to said reflecting surface.

3. A zoom lens that comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6f_W < d < 1.5f_W \quad (1)$$

$$1.2f_W < a < 3.0f_W \quad (2)$$

where $f_W$ is a focal length of a zoom lens system at a wide-angle end thereof, d is a length as measured along said optical path from an apex of a surface nearest to the object in said lens group nearest to the object to said reflecting surface, and a is a dimension of said outside shape of said positive lens in a direction parallel with an optical path portion on an object side of the zoom lens with respect to a position where said optical path is bent.

4. The zoom lens according to any one of claims 1 to 3, wherein said lens group nearest to the object has positive refracting power.

5. The zoom lens according to any one of claims 1 to 3, wherein said positive lens has an aspheric surface.

6. The zoom lens according to any one of claims 1 to 3, which comprises a prism having said reflecting surface.

7. The zoom lens according to claim 6, wherein said prism is positioned nearest to the object in the zoom lens.

8. The zoom lens according to claim 7, wherein an object-side surface of said prism is concave toward an object side of the zoom lens, and the object-side surface of said prism is an aspheric surface.

9. The zoom lens according to any one of claims 1 to 3, wherein there is an aperture stop on an image side of the zoom lens with respect to said reflecting surface for bending an optical path, and three or less lenses are interposed between said reflecting surface and said aperture stop.

10. The zoom lens according to any one of claims 1 to 3, wherein there is an aperture stop located on an image side of the zoom lens with respect to said reflecting surface, and at least three aspheric surfaces are located between said reflecting surface and said aperture stop.

11. The zoom lens according to any one of claims 1 to 3, which has a distortion-conscious diagonal angle of view of 65° or greater.

12. An electronic imaging system that comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to said object in said lens group nearest to said object to said reflecting surface, and said electronic image pickup device comprises an image pickup plane having a long-side direction and a short-side direction, wherein said short-side direction of said image pickup plane is substantially parallel with an optical axis portion on an object side with respect to the position where the optical path is bent.

13. An electronic imaging system that comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to the object in said lens group nearest to the object to said reflecting surface, and said electronic image pickup device comprises an image pickup plane having a long-side direction and a short-side direction, wherein said short-side direction of said image pickup plane is substantially parallel with an optical axis portion on an object side with respect to the position where the optical path is bent.

14. An electronic imaging system that comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6f_W < d < 1.5f_W \quad (1)$$

$$1.2f_W < a < 3.0f_W \quad (2)$$

where $f_W$ is a focal length of a zoom lens system at a wide-angle end thereof, d is a length as measured along said optical path from an apex of a surface nearest to the object in said lens group nearest to the object to said reflecting surface, and a is a dimension of said outside shape of said positive lens in a direction parallel with an optical path portion on an object side of the zoom lens with respect to a position where said optical path is bent, and said electronic image pickup device comprises an image pickup plane having a long-side direction and a short-side direction, wherein said short-side direction of said image pickup plane is substantially parallel with an optical axis portion on an object side with respect to the position where the optical path is bent.

15. An electronic imaging system that comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent, with satisfaction of condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to said object in said lens group nearest to said object to said reflecting surface, and further comprises an image processing system for applying distortion-compensation image processing to image data obtained by picking up an image at said electronic image pickup device for producing image data output with changed distortion.

16. An electronic imaging system that comprises a zoom lens and an electronic image pickup device located at or near an image-formation position of the zoom lens, wherein:

said zoom lens comprises a lens group located nearest to an object and comprising a reflecting surface for bending an optical path and a positive lens found first as viewed from said reflecting surface along said optical path toward an image side of the zoom lens, wherein said positive lens has a non-circular outside shape configured such that a dimension thereof in a direction parallel with an optical path portion located on an object side of the zoom lens with respect to a position where said optical path is bent becomes smallest, with satisfaction of condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to the object in said lens group nearest to the object to said reflecting surface, and further comprises an image processing system for applying distortion-compensation image processing to image data obtained by picking up an image at said electronic image pickup device for producing image data output with changed distortion.

17. An electronic imaging system that comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface along said optical path toward an image side of the zoom lens, with satisfaction of conditions (1) and (2):

$$0.6f_W < d < 1.5f_W \quad (1)$$

$$1.2f_W < a < 3.0f_W \quad (2)$$

where $f_W$ is a focal length of a zoom lens system at a wide-angle end thereof, d is a length as measured along said optical path from an apex of a surface nearest to the object in said lens group nearest to the object to said reflecting surface, and a is a dimension of said outside shape of said positive lens in a direction parallel with an optical path portion on an object side of the zoom lens with respect to a position where said optical path is bent, and further comprises an image processing system for applying distortion-compensation image processing to image data obtained by picking up an image at said electronic image pickup device for producing image data output with changed distortion.

18. An electronic imaging system that comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface along said optical path toward an image side of the zoom lens, and further comprises an image processing system for applying distortion-compensation image processing to image data obtained by picking up an image at said electronic image pickup device and for producing image data output with changed distortion.

19. An electronic imaging system that comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface along said optical path toward an image side of the zoom lens, and said electronic image pickup device comprises an image processing system for applying distortion-compensation image processing to image data obtained by picking up an image at said electronic image pickup device for producing image data output with changed distortion and which satisfies condition (1):

$$0.6f_W < d < 1.5f_W \quad (1)$$

where $f_W$ is a focal length of a zoom lens system at a wide-angle end thereof, and d is a length as measured along said optical path from an apex of a surface nearest to the object in said lens group nearest to the object to said reflecting surface.

20. An electronic imaging system that comprises a zoom lens and an electronic image pickup device located at or near an image-formation position of the zoom lens, wherein said zoom lens comprises a lens group located nearest to an object and comprising a reflecting surface for bending an optical path and a positive lens found first as viewed from said reflecting surface alone said optical path toward an image side of the zoom lens, and said electronic image pickup device comprises an image processing system for applying distortion-compensation image processing to image data obtained by picking up an image at said electronic image pickup device for producing image data output with changed distortion and which satisfies condition (5):

$$0.8 < Y_{07}/(f_W \tan \omega_{07W}) < 0.96 \quad (5)$$

where, given that $y_{10}$ is a distance (maximum image height) 20 from a center lying within an effective image pickup plane of the electronic image pickup device (capable of picking up images) to the farthest point, $y_{07}=0.7Y_{10}$, and $\omega_{Q7W}$ is an angle with the optical axis, at the wide-angle end, of an object point direction corresponding to an image point connecting a center on the image pickup plane with a position of $y_{07}$.

21. The electronic imaging system according to claim 18, wherein said positive lens has an outside shape configured such that a dimension thereof in a direction parallel with an optical path portion on an object side of the zoom lens system with respect to a position where said optical path is bent is smaller than a dimension thereof in a direction vertical to a plane including an optical axis portion before and after the position where said optical axis is bent.

22. The electronic imaging system according to claim 18 wherein said lens group nearest to the object has positive refracting power.

* * * * *